(12) United States Patent
Brettschneider et al.

(10) Patent No.: US 8,158,099 B2
(45) Date of Patent: Apr. 17, 2012

(54) PROCESS FOR PRODUCING CHLORINE FROM HCL

(75) Inventors: Ole Brettschneider, Berlin (DE); Knud Werner, Krefeld (DE); Jun Wang, Ratingen (DE); Carsten Welz, Leverkusen (DE); Annette Conrad, Düsseldorf (DE); Karsten-Ulrich Klatt, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/597,611

(22) PCT Filed: Apr. 14, 2008

(86) PCT No.: PCT/EP2008/003109
§ 371 (c)(1), (2), (4) Date: Oct. 26, 2009

(87) PCT Pub. No.: WO2008/131872
PCT Pub. Date: Nov. 6, 2008

(65) Prior Publication Data
US 2010/0086473 A1      Apr. 8, 2010

(30) Foreign Application Priority Data
Apr. 26, 2007    (DE) .................. 10 2007 020 148

(51) Int. Cl.
*C01B 7/04* (2006.01)

(52) U.S. Cl. .................. 423/502; 423/500; 423/507
(58) Field of Classification Search .................. 423/500, 423/502, 507
See application file for complete search history.

(56) References Cited

U.S. PATENT DOCUMENTS

| | | | | |
|---|---|---|---|---|
| 4,394,367 A | * | 7/1983 | Foster | 423/502 |
| 4,774,070 A | * | 9/1988 | Itoh et al. | 423/502 |
| 5,000,006 A | * | 3/1991 | Itoh et al. | 62/635 |
| 6,387,345 B1 | | 5/2002 | Gestermann et al. | |
| 2005/0031529 A1 | * | 2/2005 | Hibi et al. | 423/502 |
| 2006/0099138 A1 | | 5/2006 | Walsdorff et al. | |
| 2006/0263290 A1 | | 11/2006 | Walsdorff et al. | |
| 2007/0274898 A1 | * | 11/2007 | Weber et al. | 423/502 |
| 2007/0292336 A1 | * | 12/2007 | Wolf et al. | 423/502 |
| 2008/0159948 A1 | | 7/2008 | Sesing et al. | |
| 2008/0269515 A1 | * | 10/2008 | Haas et al. | 560/341 |

FOREIGN PATENT DOCUMENTS

| | | |
|---|---|---|
| DE | 19535716 A1 | 3/1997 |
| EP | 0518553 A1 | 12/1992 |
| WO | WO-2004/037718 A2 | 5/2004 |
| WO | WO-2005/014470 A1 | 2/2005 |
| WO | WO-2006/089877 A1 | 8/2006 |

* cited by examiner

*Primary Examiner* — Ngoc-Yen Nguyen
(74) *Attorney, Agent, or Firm* — Connolly Bove Lodge & Hutz LLP

(57) ABSTRACT

A process is described for the production of chlorine by a catalysed gas-phase oxidation of hydrogen chloride with an oxygen-containing gas stream.

16 Claims, 3 Drawing Sheets

PROCESS FOR PRODUCING CHLORINE FROM HCL

CROSS-REFERENCE TO RELATED APPLICATIONS

This application is a national stage application, under 35 U.S.C. §371, of PCT/EP2008/003109, filed Apr. 14, 2008, which claims priority of German Patent Application No. 10 2007 020 148.8, filed Apr. 26, 2007.

BACKGROUND OF THE INVENTION

The process of catalytic oxidation of hydrogen chloride with oxygen in an exothermic equilibrium reaction developed by Deacon in 1868 was the beginning of industrial chlorine chemistry. However, chlor-alkali electrolysis pushed the Deacon process far into the background. Almost all chlorine production has taken place by electrolysis of aqueous solutions of sodium chloride. In recent times, however, the Deacon process is becoming more attractive again as worldwide chlorine requirements are growing more strongly than demand for sodium hydroxide, a co-product of electrolysis. This development is accommodated by the process for the production of chlorine by the oxidation of hydrogen chloride, which is uncoupled from the production of sodium hydroxide. Moreover, the starting product hydrogen chloride is readily accessible; it is obtained in large quantities as a co-product, for example in phosgenation reactions such as isocyanate production.

BRIEF SUMMARY OF THE INVENTION

The present invention relates to a process for the production of chlorine by a catalysed gas-phase oxidation of hydrogen chloride with an oxygen-containing gas stream.

The object of the invention is to provide an optimisation of the process mechanisms in the Deacon process.

The process according to the invention for the production of chlorine from HCl consists of the following process stages:
a) compressing the HCl gas feed (stream 1) in an HCl compression step to an elevated pressure;
b) purifying the compressed HCl feed gas (stream 2) in an HCl gas purification step;
c) combining an oxygen-containing return stream (stream 16) with the purified HCl gas stream (stream 3) to form a feedstock stream 4;
d) introducing the combined feedstock stream (stream 4) into the oxidation zone, in which HCl and oxygen are partially reacted to form chlorine and water, and a product stream 5, containing chlorine, oxygen, HCl and water, is obtained;
e) introducing the product stream 5 into a process step 33 for the separation of HCl and water in the form of aqueous hydrochloric acid (stream 6) from the product stream;
f) introducing the product stream 7 at least partly freed from HCl and water into a process step for further drying with a reduction of the proportion of water in the gas stream;
g) introducing the dried gas stream 8 obtained from the drying step into a chlorine compression step to increase the pressure of the gas stream 8 with the formation of a compressed gas stream 9;
h) introducing the compressed gas stream 9 into a step for the at least partial separation of the chlorine (stream 10) contained in the gas 9 with the formation of a gas stream 11, which contains unreacted oxygen;
i) introducing the gas stream 11 remaining after the chlorine separation into a gas-washing process step to form a purified stream 14, a partial stream 12 of the gas being discharged between the chlorine separation and the gas washing (as illustrated in FIG. 1) or downstream of the gas washing (not illustrated in FIG. 1);
j) introducing the discharged gas stream 12 into a waste gas treatment step;
k) combining the stream 14 coming out of the gas-washing step, containing unreacted oxygen, with a stream 15 containing fresh oxygen to form a stream 16;
l) returning the stream 16 into the process stage c).

The process according to the invention is characterised in that
A) adjustable flow adjustment devices are provided in the lines for the purified hydrogen chloride stream, the gas stream remaining after the chlorine separation, the partial gas stream which is introduced into the waste gas treatment step and the fresh oxygen-containing stream,
B) pressure measuring instruments are provided downstream of or within the process stage for purification of the hydrogen chloride stream, in the chlorine separation and in the line for the stream remaining after the chlorine separation downstream of the flow adjustment device to be provided in this stream,
C) flow measuring instruments are provided in the lines for the purified hydrogen chloride stream, the gas stream remaining after the chlorine separation after discharging a partial stream for waste gas treatment and the fresh oxygen-containing stream,
D) an instrument for measuring the oxygen concentration is provided in the gas stream remaining after the chlorine separation after discharging a partial stream for waste gas treatment,
E) both compression steps, i.e. the hydrogen chloride compression and the chlorine compression, are provided with adjustable performance,
and to ensure advantageous operation of the plant
F) by means of a first control unit the purified hydrogen chloride stream is maintained at a constant rate of flow by adjusting the flow adjustment device in this stream,
G) by means of a second control unit the pressure measured in or downstream of the process step for purifying the compressed hydrogen chloride stream is maintained at a constant value by adjusting the hydrogen chloride compression step,
H) by means of a third control unit the fresh oxygen-containing stream is maintained at a constant flow rate ratio to the purified hydrogen chloride stream by adjusting the flow adjustment device in the fresh oxygen-containing stream,
I) by means of a fourth control unit the aforementioned flow rate ratio between the purified hydrogen chloride stream and the oxygen-containing stream is adjusted such that the oxygen content that is measured in the gas stream remaining after the chlorine separation after discharge of a partial stream for waste gas treatment is kept constant,
J) by means of a fifth control unit the pressure measured in the gas stream remaining after the chlorine separation downstream of the flow adjustment device to be provided in this stream is maintained at a constant value by adjusting the flow adjustment device for the partial stream introduced into the waste gas treatment,
K) by means of a sixth control device the gas stream remaining after the chlorine separation after discharge of a partial stream for waste gas treatment is maintained at a constant value by adjusting the chlorine compression step, and
L) by means of a seventh control device the pressure measured in the chlorine separation is maintained at a constant value by adjusting the flow adjustment device in the gas stream remaining after the chlorine separation.

DETAILED DESCRIPTION OF THE INVENTION

The process according to the invention is a recirculation process which makes increased demands on the operating method.

For example, the stream into the oxidation zone 32 must be regulated so as to be able to control the instance of hot spots in the reaction. This is easiest to achieve if the two streams 3 and 16 are kept constant. However, since the oxygen-containing stream 16 is returned from the process, a feedback occurs which can lead to undesirable oscillations in the circulation formed thereby. It is therefore necessary to apply a type of regulation here that goes beyond conventional regulation strategies. Furthermore, undesirable secondary components have to be separated out of the recirculation, as otherwise these would accumulate in the process. Since the secondary components are not formed in a constant quantity, this leads to further fluctuation in the return stream 16, which also entails the need for regulation.

The pressure in the process is another key variable. Thus, for example, the density of the gas streams fluctuates with changes in pressure so that the rates of flow can shift into ranges that are undesirable for the operation of the process. Since the reaction conversion is also dependent on pressure, the conversion and thus the compositions of the streams would fluctuate as a result of changes in pressure. The process therefore has to be regulated such that the pressure is as constant as possible. In the area of the chlorine separation step h), the pressure must additionally be raised in order to enable the chlorine to be separated off by condensation. To avoid fluctuations here, which would have a direct effect on condensation performance, this increased pressure must also be as constant as possible.

Figure 1:
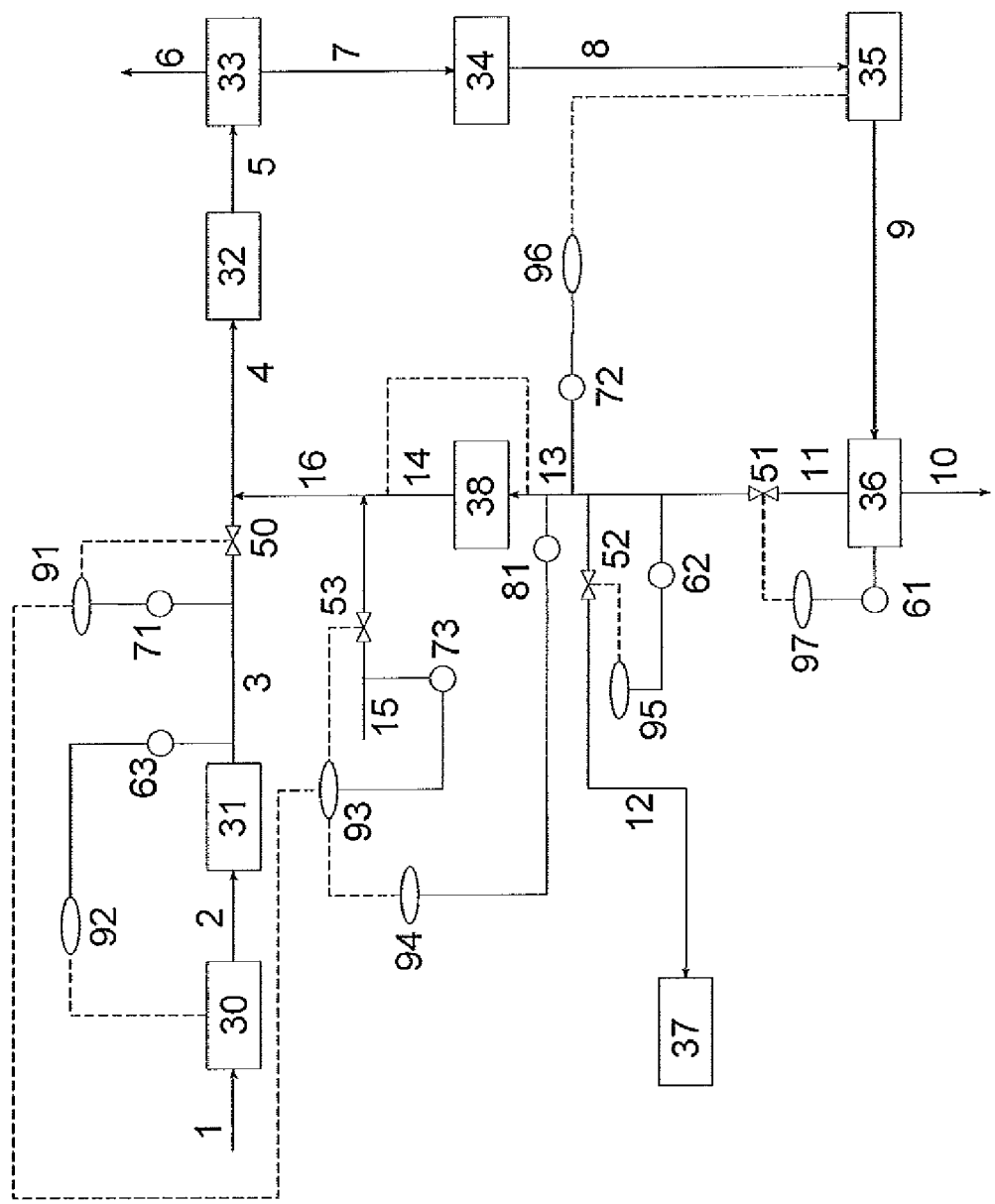
FIG. 1 illustrates a process according to an embodiment of the present invention.

Corresponding investigations in connection with this have shown that an advantageous operation is achieved by providing suitable, adjustable flow adjustment devices in the streams 3, 11, 12 and 15. At the same time, appropriate pressure measuring instruments should be provided in the chlorine separation step 36 and in the stream 11 (downstream of the flow adjustment device to be provided in the stream 11) as well as downstream of or within the HCl gas purification b). Moreover, flow measuring instruments should be provided in the streams 3, 13 and 15 and an instrument for measuring the oxygen concentration in the stream 13 (as illustrated in FIG. 1) or in the stream 11, 12, 14 or 16 (not illustrated in FIG. 1). In addition, the two compression steps (HCl compression and chlorine compression) should be provided with variable performance.

An advantageous operation of the process is now achieved by the fact that, by means of a first control unit, the rate of flow of HCl measured in the stream 3 is maintained at a constant value by adjusting the flow adjustment device in the stream 3.

By means of a second control unit the pressure measured in or downstream of the HCl gas purification is to be maintained at a constant value by adjusting the HCl compressor.

By means of a third control unit the rate of flow measured in the stream 15 is to be maintained at a constant ratio to the rate of flow measured in the stream 3 by adjusting the flow adjustment device in the stream 15.

By means of a fourth control unit the aforementioned ratio between the HCl stream 3 and the oxygen-containing stream 16 is to be adjusted finely so that the oxygen content measured in the stream 13 (or in the stream 11, 12, 14 or 16) is kept constant.

By means of a fifth control unit the pressure measured in the stream 11 downstream of the flow adjustment device to be provided in 11 is to be maintained at a constant value by adjusting the flow adjustment device to be provided in the stream 12.

By means of a sixth control device the rate of flow measured in the stream 13 is to be maintained at a constant value by adjusting the chlorine compressor.

By means of a seventh control device the pressure measured in the chlorine separation is maintained at a constant value by adjusting the flow adjustment device to be provided in the stream 11.

Figure 2:
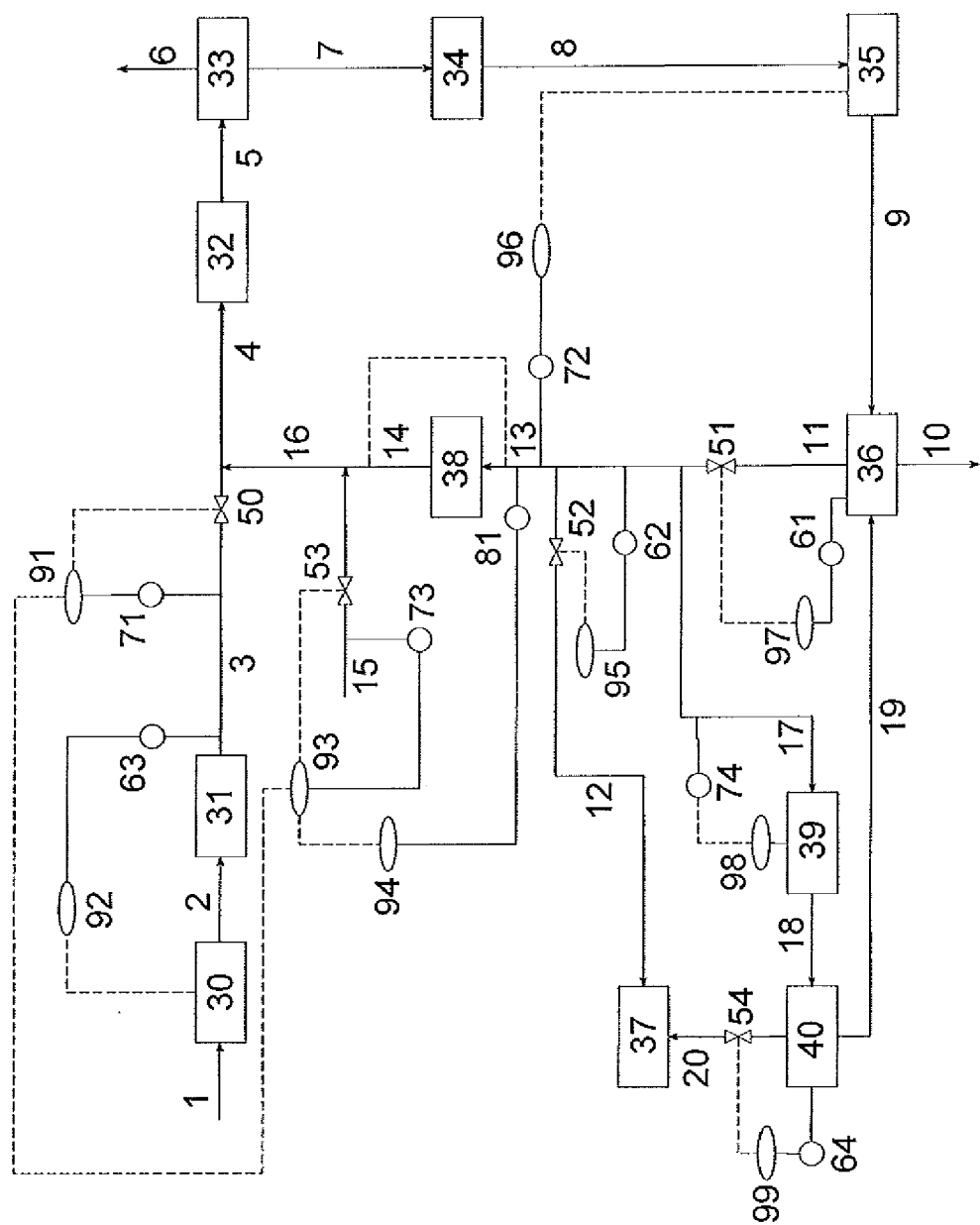
FIG. 2 illustrates a process according to another embodiment of the present invention.

A particular embodiment of the process according to the invention is illustrated in FIG. 2 and has the following process stages:

1. compressing the HCl gas feed (stream 1) in an HCl compression step to an elevated pressure;
2. purifying the compressed HCl feed gas (stream 2) in an HCl gas purification step;
3. combining an oxygen-containing return stream (stream 16) with the purified HCl feed gas stream (stream 3) to form a feedstock stream 4;
4. introducing the combined feedstock stream (stream 4) into the oxidation zone, in which HCl and oxygen are partially reacted to form chlorine and water, and a product stream 5, containing chlorine, oxygen, HCl and water, is obtained;
5. introducing the product stream 5 into a process step 33 for the separation of HCl and water in the form of aqueous hydrochloric acid (stream 6) from the product stream;
6. introducing the product stream 7 at least partly freed from HCl and water into a drying step for further drying with a reduction of the proportion of water in the gas stream;
7. introducing the dried gas stream 8 obtained from the drying step into a chlorine compression step to increase the pressure of the reaction gas stream with the formation of a compressed gas stream 9;
8. introducing the compressed gas stream 9 into a separation step for the at least partial separation of the chlorine contained in the gas (stream 10) with the formation of a gas stream 11, which contains unreacted oxygen;
9. introducing the gas stream 11 remaining after the chlorine separation into a process step for gas washing to form a purified stream 14, a partial stream 17 of the gas stream 11 being discharged between the chlorine separation and the gas washing;
10. introducing the discharged gas stream 17 into a pressure increasing step, in which the pressure is increased to form a compressed gas stream 18;
11. introducing the compressed gas stream 18 into a $Cl_2$ recovery step, in which the chlorine contained in the stream 18 is separated off by distillation at low temperature and is fed into the $Cl_2$ separation as the return stream 19, and the remaining gas stream 20 is fed into a waste gas treatment;
12. separating a partial stream 12 from the stream 11 and introducing the stream 12 into the waste gas treatment already mentioned in 11, or optionally previously combining it with the stream 20;

13. combining the stream 14 coming from the gas-washing step with a fresh oxygen-containing stream 15 with the formation of a return stream 16;
14. combining the return stream 16 with the stream 3 as described in 3.

In particular, it is also provided here that an adjustable flow adjustment device 54 is provided in the line of the gas stream 20 remaining after the chlorine recovery step 40;

a flow measuring instrument 74 is provided in the further partial stream 17, which is fed into the pressure increasing step 39;

a pressure measuring instrument 64 is provided in or downstream of the chlorine recovery step 40, upstream of the flow adjustment device 54 for the gas stream 20 remaining after this step;

the pressure increasing unit 39 is provided with adjustable performance;

by means of an eighth control device 98, the further partial stream 17 is adjusted by adjusting the performance of the pressure increasing unit 39 such that the partial stream 12 described above to the waste gas treatment 37 is minimised, and by means of a ninth control device 99 the pressure measured in or downstream of the chlorine recovery step 40 is kept constant.

In this particular embodiment of the new process, corresponding investigations have shown that an advantageous operation is achieved by providing suitable adjustable flow adjustment devices in the streams 3, 11, 12, 15 and 20. At the same time, corresponding pressure measuring instruments should be provided in the chlorine separation 36 and in the stream 11 (downstream of the flow adjustment device to be provided in the stream 11) as well as downstream of or within the HCl gas purification and in the $Cl_2$ recovery. Furthermore, flow measuring instruments should be provided in the streams 3, 13, 15 and 17 and an instrument for measuring the oxygen concentration in the stream 13. In addition, the compression steps (HCl compression, chlorine compression and pressure increasing step) should be provided with adjustable performance.

An advantageous operation of the process is now achieved in that, by means of a first control unit, the rate of flow of HCl measured in the stream 3 is maintained at a constant value by adjusting the flow adjustment device in the stream 3.

By means of a second control unit the pressure measured in or downstream of the HCl gas purification should be maintained at a constant value by adjusting the HCl compressor.

By means of a third control unit the rate of flow measured in the stream 15 should be maintained at a constant ratio to the rate of flow measured in the stream 3 by adjusting the flow adjustment device in the stream 15.

By means of a fourth control unit the aforementioned ratio between the stream 3 and the stream 15 should be finely adjusted so that the oxygen content measured in the stream 13 is kept constant.

By means of a fifth control unit the pressure measured in the stream 11 downstream of the flow adjustment device to be provided in 11 should be maintained at a constant value by adjusting the flow adjustment device to be provided in the stream 12.

By means of a sixth control device the rate of flow measured in the stream 13 should be maintained at a constant value by adjusting the chlorine compressor.

By means of a seventh control device the pressure measured in the chlorine separation is maintained at a constant value by adjusting the flow adjustment device to be provided in the stream 11.

By means of an eighth control device the rate of flow measured in the stream 17 should be adjusted by adjusting the pressure increasing step such that the stream 12 is minimised.

By means of a ninth control device the pressure measured in the $Cl_2$ recovery step should be maintained at a constant value by adjusting the flow adjustment device to be provided in the stream 20.

The gas washing can be omitted in one embodiment of the invention, however, if no significant quantities of catalyst-deactivating components are contained in the gas stream.

A preferred embodiment of the process is characterised in that the pressure adjusted by the second control unit (92) is 2 to 20 bar, the oxygen content adjusted by the fourth control unit (94) is 10 to 90 vol. %, the pressure adjusted by the fifth control unit (95) is 2 to 20 bar, and the pressure adjusted by the seventh control unit (97) is 6 to 30 bar.

Preferably, the catalytic process known as the Deacon process is used in the oxidation zone. In this process, hydrogen chloride is oxidised with oxygen in an exothermic equilibrium reaction to give chlorine, with water vapour being formed. The reaction temperature is normally 150 to 500° C. and the usual reaction pressure is 1 to 25 bar. Since this is an equilibrium reaction, it is useful to work at the lowest possible temperatures at which the catalyst still displays adequate activity. Moreover, it is useful to use oxygen in hyperstoichiometric amounts in relation to the hydrogen chloride. For example, a two- to four-fold oxygen excess is usual. Since there is no risk of selectivity losses, it may be economically advantageous to work under relatively high pressure and accordingly with a longer residence time compared with standard pressure.

Suitable preferred catalysts for the Deacon process contain ruthenium oxide, ruthenium chloride or other ruthenium compounds on silicon dioxide, aluminium oxide, titanium dioxide or zirconium dioxide as support. Suitable catalysts can be obtained for example by applying ruthenium chloride on to the support and subsequently drying or drying and calcining. Suitable catalysts can also contain, as a supplement to or instead of a ruthenium compound, compounds of other noble metals, e.g. gold, palladium, platinum, osmium, iridium, silver, copper or rhenium. Suitable catalysts can also contain chromium(III) oxide.

The catalytic hydrogen chloride oxidation can be carried out adiabatically or preferably isothermally or almost isothermally, batchwise, but preferably continuously as a fluidised or fixed bed process, preferably as a fixed bed process, particularly preferably in shell and tube reactors on heterogeneous catalysts at a reactor temperature of 180 to 500° C., preferably 200 to 400° C., particularly preferably 220 to 350° C., and a pressure of 1 to 25 bar (1000 to 25000 hPa), preferably 1.2 to 20 bar, particularly preferably 1.5 to 17 bar and most preferably 2.0 to 15 bar.

Conventional reaction apparatus in which the catalytic hydrogen chloride oxidation is carried out comprises fixed bed or fluidised bed reactors. The catalytic hydrogen chloride oxidation can preferably also be carried out in multiple steps.

In the isothermal or almost isothermal method, it is also possible to use several, i.e. 2 to 10, preferably 2 to 6, particularly preferably 2 to 5, most preferably 2 to 3, reactors connected in series with additional intermediate cooling. The hydrogen chloride can be added either in its entirety together with the oxygen upstream of the first reactor or distributed over all the reactors. This series connection of individual reactors can also be brought together in one piece of equipment.

Another preferred embodiment of an apparatus that is suitable for the process consists in using a structured catalyst bed in which the catalyst activity increases in the direction of flow. Such a structuring of the catalyst bed can take place by varying impregnation of the catalyst supports with active material or by varying dilution of the catalyst with an inert material. It is possible to use for example rings, cylinders or spheres of titanium dioxide, zirconium dioxide or mixtures thereof, aluminium oxide, steatite, ceramics, glass, graphite, stainless steel or nickel alloys as the inert material. In the preferred use of shaped catalysts, the inert material should preferably have similar external dimensions.

Suitable as shaped catalysts are shaped bodies having any shapes, preferred shapes being pellets, rings, cylinders, stars, wagon wheels or spheres, particularly preferably rings, cylinders or star-shaped extrudates.

Particularly suitable as heterogeneous catalysts are ruthenium compounds or copper compounds on support materials, which can also be doped; optionally doped ruthenium catalysts are preferred. Suitable as support materials are, for example, silicon dioxide, graphite, titanium dioxide with rutile or anatase structure, zirconium dioxide, aluminium oxide or mixtures thereof, preferably titanium dioxide, zirconium dioxide, aluminium oxide or mixtures thereof, particularly preferably γ- or δ-aluminium oxide or mixtures thereof.

The copper or ruthenium support catalysts can be obtained for example by impregnating the support material with aqueous solutions of $CuCl_2$ or $RuCl_3$ and optionally a promoter for doping, preferably in the form of their chlorides. The shaping of the catalyst can take place after or preferably before the impregnation of the support material.

Suitable as promoters for the doping of the catalysts are alkali metals such as lithium, sodium, potassium, rubidium and caesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof.

The shaped bodies can then be dried and optionally calcined at a temperature of 100 to 400° C., preferably 100 to 300° C., e.g. under a nitrogen, argon or air atmosphere. The shaped bodies are preferably first dried at 100 to 150° C. and then calcined at 200 to 400° C.

The conversion of hydrogen chloride in a single pass can preferably be limited to 15 to 95%, preferably 40 to 90%, particularly preferably 50 to 90%. Unreacted hydrogen chloride can be separated off and then returned partially or completely to the catalytic hydrogen chloride oxidation. The volume ratio of hydrogen chloride to oxygen at the entrance to the reactor is preferably 1:1 to 20:1, preferably 1:1 to 8:1, particularly preferably 1:1 to 5:1.

As catalyst, it is preferable to use a ruthenium catalyst, particularly a catalyst based on ruthenium chloride as the catalytic component and tin oxide as the support material.

EXAMPLES

Example 1

In this example the advantageous operation of the process according to the invention is described with the aid of FIG. 1.

An HCl gas stream 1 with a constant entry pressure is compressed in a compressor 30. This compressor 30 has a blown circulation line (not shown) from the delivery side to the inlet side to regulate performance. The blown circulation line is provided with a control valve.

The compressed gas stream 2 is then first cooled in a gas purification step 31 sufficiently so that organic impurities condense or freeze out. It is then passed through an activated charcoal bed in which the last organic impurities are removed. The pressure downstream of the activated charcoal bed is measured. By means of a regulator circuit consisting of the pressure measurement 63, the control valve in the blown circulation line of the HCl compressor 30 and the control unit 92, this pressure is maintained at 6 bar. After the pressure, the HCl flow rate is also measured. Another control valve 50 installed downstream of this forms, together with the flow measurement 71 and the control unit 91, another regulator circuit with which the purified HCl gas stream 3 is adjusted to 10 t/h. As the stream flows through the control valve, the pressure falls to 5.5 bar.

The purified HCl gas stream 3 is then combined with an oxygen-containing return stream 16 of 14 t/h to form the feedstock stream 4. The return stream 16 contains 30 vol. % oxygen.

While subsequently flowing through a reaction zone 32, by means of appropriate selection of temperature and residence time, 87% of the HCl fed in is reacted on a heterogeneous Ru catalyst to form $Cl_2$ and $H_2O$.

Unreacted HCl and the majority of the water produced are separated off from the product gas 5 in a separating process 33 as 30% hydrochloric acid 6.

The remaining gas stream 7 of 21 t/h is brought into contact with sulfuric acid in the next step 34 and thus dried.

In a chlorine compressor 35 the dried gas stream 8 is compressed to 12 bar. The chlorine compressor 35 is, like the HCl compressor 30, equipped with a blown circulation line with control valve (not shown).

In a connected distillation column 36, the dried and compressed gas stream 9 is freed of components such as $O_2$, $N_2$ and $CO_2$ (stream 11). The chlorine 10 forming at the bottom of this column is drawn off as a liquid. The separated components are removed in gaseous form at the head of the column. In the head line there is a pressure measurement 61 and downstream of this a control valve 51, which form, together with the seventh control device 97, a regulator circuit with which the pressure in the head line is maintained at 12 bar.

Downstream of the control valve 51 a partial stream 12 of 0.4 t/h is discharged and fed into a waste gas treatment 37, in which residual chlorine gas is removed. The discharged flow 12 is adjusted via a control valve 52. For this purpose, another pressure measurement 62 is installed upstream of the discharge line with a fifth control device 95; the two form a regulator circuit together with the control valve 52. The control valve 52 allows sufficient gas to pass for a pressure of 5.6 bar to be maintained.

After the partial stream discharge, the rate of flow of the remaining gas 13 from the head line of the distillation column is measured (measuring instrument 72). With another measuring instrument 81 the $O_2$ content is measured. The flow measurement 72 and the control valve in the blown circulation line of the chlorine compressor form a regulator circuit with the control device 96, with which the rate of flow of the gas 13 remaining after the partial stream discharge is adjusted to 12 t/h. The set value follows the HCl gas stream fed in, so that when this increases, the rate of flow being regulated here also increases.

Since the remaining gas 13 is returned into the process, it should first be freed of components that can deactivate the catalyst in the reaction zone 32. For this purpose, a gas wash 38 is provided from which the purified gas stream 14 exits. If the remaining gas 13 contains no catalyst-deactivating components, it can bypass the gas wash 38 (shown as a broken line).

Downstream of the gas wash 38, fresh oxygen 15 is fed in to replace the oxygen consumed in the process. The rate of flow is measured with the flow measuring instrument 73. Downstream of the measurement there is a control valve 53, which forms, together with the flow measurement 73 and the third control unit 93, a regulator circuit. With this regulator circuit, again following the HCl gas stream 3 fed in, the quantity of fresh oxygen 15 is adjusted to 2 t/h. By means of the measurement of the $O_2$ content described above and the control unit 94, this adjustment is performed as a correction.

Example 2

In this example, a preferred operating method of the process according to the invention with additional chlorine recovery is described with the aid of FIG. 2. An HCl gas stream 1 with constant entry pressure is compressed in a compressor 30. This compressor 30 has a blown circulation line (not shown) from the delivery side to the inlet side to regulate performance. The blown circulation line is provided with a control valve.

The compressed gas stream 2 is then first cooled in a gas purification step 31 sufficiently so that organic impurities condense or freeze out. It is then passed through an activated charcoal bed in which the last organic impurities are removed. The pressure downstream of the activated charcoal bed is measured. By means of a regulator circuit consisting of the pressure measurement 63, the control valve in the blown circulation line of the HCl compressor 30 and the control unit 92, this pressure is maintained at 6 bar. After the pressure, the HCl flow rate is also measured. Another control valve 50 installed downstream of this forms, together with the flow measurement 71 and control unit 91, another regulator circuit with which the purified HCl gas stream is adjusted to 10 t/h. As the stream flows through the control valve, the pressure falls to the pressure in the circuit.

The purified HCl gas stream 3 is then combined with an oxygen-containing return stream 16 of 14 t/h to form the feedstock stream 4. The return stream 16 contains 30 vol. % oxygen.

While subsequently flowing through a reaction zone 32, by means of appropriate selection of temperature and residence time, 87% of the HCl fed in is reacted on a heterogeneous Ru catalyst to form $Cl_2$ and $H_2O$.

Unreacted HCl and the majority of the water produced are separated off from the product gas 5 in a separating process 33 as 30% hydrochloric acid 6.

The remaining gas stream 7 of 21 t/h is brought into contact with sulfuric acid in the next step 34 and thus dried.

In a chlorine compressor 35 the dried gas stream 8 is compressed to 12 bar. The chlorine compressor 35 is, like the HCl compressor 30, equipped with a blown circulation line with control valve (not shown).

In a connected distillation column 36, the dried and compressed gas stream 9 is freed of components such as $O_2$, $N_2$ and $CO_2$ (stream 11). The chlorine 10 forming at the bottom of this column is drawn off as a liquid. The separated components are removed in gaseous form at the head of the column. In the head line there is a pressure measurement 61 and downstream of this a control valve 51, which form, together with the seventh control device 97, a regulator circuit with which the pressure in the head line is maintained at 12 bar.

Downstream of the control valve 51 a partial stream 12 of 0.1 t/h is discharged and fed into a waste gas treatment 37, in which residual chlorine gas is removed. The discharged flow 12 is adjusted via a control valve 52. For this purpose, another pressure measurement 62 is installed upstream of the discharge line with a fifth control device 95; the two form a regulator circuit together with the control valve 52. The control valve 52 allows sufficient gas to pass for a pressure of 5.6 bar to be maintained. Another partial stream 17 of 0.3 t/h is drawn off before the partial stream 12 for additional chlorine recovery and fed into the compressor 39. The compressor 39 possesses a blown circulation line (not shown) from the delivery side to the inlet side to regulate performance. The blown circulation line is provided with a control valve. The compressed, other partial stream 18 is then fed into a distillation column 40 in which liquefied chlorine 19 is separated off at a reduced temperature and returned into the chlorine separation 36. The rate of flow of the partial stream 17 is measured with the aid of the flow measuring instrument 74 and kept constant by a regulator circuit consisting of this flow measuring instrument, the control unit 98 and the control valve in the blown circulation line of the compressor 39. Into the line of the gas stream 20 from the head of the column 40 a control valve 54 is connected, which keeps the pressure in the distillation column constant via the pressure measurement 64 and the control unit 99. The partial stream 20 purified in this way is fed to the waste gas treatment 37.

After the discharge of the partial streams 12 and 17 the rate of flow of the remaining gas 13 from the head line of the distillation column is measured with the measuring instrument 72. With another measuring instrument 81 the $O_2$ content is measured. The flow measurement, the control valve in the blown circulation line (not shown) of the chlorine compressor and the control device 96 form a regulator circuit, with which the rate of flow of the gas 13 remaining after the partial stream discharge is adjusted to 12 t/h. The set value follows the HCl gas stream fed in, so that when this increases, the rate of flow being regulated here also increases.

Since the remaining gas 13 is returned into the process, it should be freed of components that deactivate the catalyst in the reaction zone. For this purpose, a gas wash 38 is provided from which the purified gas stream 14 exits. If the remaining gas 13 contains no catalyst-deactivating components, it can bypass the gas wash 38 (alternative shown as a broken line in FIG. 2).

Downstream of the gas wash 38, fresh oxygen 15 is fed in to replace the oxygen consumed in the process. The rate of flow is measured (measuring instrument 73). Downstream of the measurement there is a control valve 53, which forms, together with the flow measurement 73 and the third control unit 93, a regulator circuit. With this regulator circuit, following the HCl gas stream 3 fed in, the quantity of fresh oxygen 15 is adjusted to 2 t/h By means of the measurement of the $O_2$ content described above and the control unit 94, this adjustment is performed as a correction.

Example 3

Comparison

Figure 3:
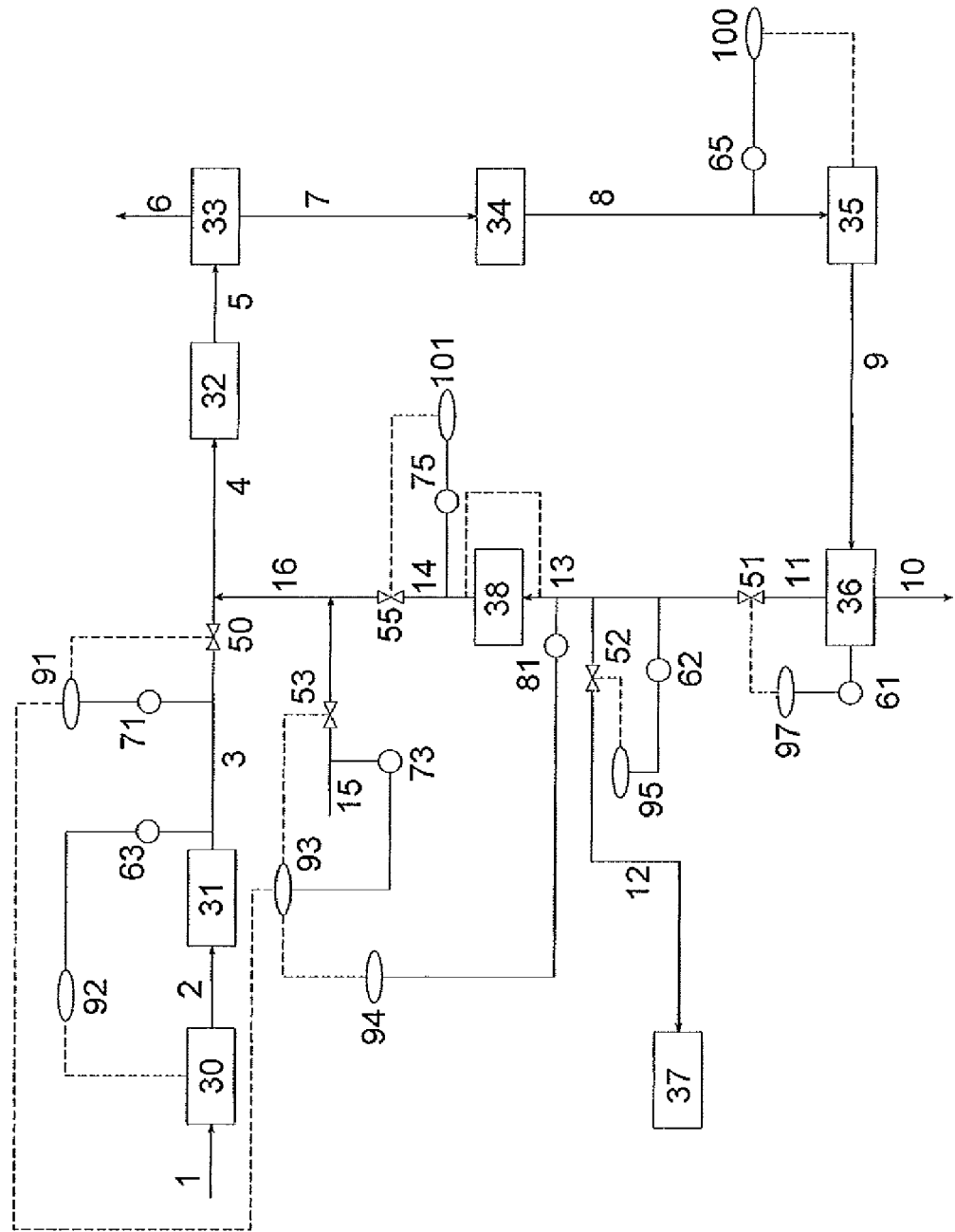
FIG. 3 illustrates a comparison process derived from conventional regulating strategies.

In this example, with the aid of FIG. 3, an operating method is described which can be derived from the conventional regulating strategies for processes without a circulating mode of operation but which represents additional costs compared with the operating method according to example 1. An HCl gas stream 1 with a constant input pressure is compressed in a compressor 30. This compressor 30 has a blown circulation line (not shown) from the delivery side to the inlet side to regulate performance. The blown circulation line is provided with a control valve.

The compressed gas stream 2 is then first cooled in a gas purification step 31 sufficiently so that organic impurities condense or freeze out. It is then passed through an activated charcoal bed in which the last organic impurities are removed. The pressure downstream of the activated charcoal bed is measured. By means of a regulator circuit consisting of the pressure measurement 63, the control valve in the blown circulation line of the HCl compressor 30 and the control unit 92, this pressure is maintained at 6 bar. After the pressure, the HCl flow rate is also measured. Another control valve 50 installed downstream of this forms, together with the flow measurement 71 and control unit 91, another regulator circuit with which the purified HCl gas stream is adjusted to 10 t/h. As the stream flows through the control valve, the pressure falls to the pressure in the circuit.

The purified HCl gas stream 3 is then combined with an oxygen-containing return stream 16 of 14 t/h to form the feedstock stream 4. The return stream 16 contains 30 vol. % oxygen.

When subsequently flowing through a reaction zone 32, by means of an appropriate selection of temperature and residence time 87% of the HCl fed in is reacted on a heterogeneous Ru catalyst to form $Cl_2$ and $H_2O$.

Unreacted HCl and the majority of the water produced are separated off from the product gas 5 in a separation process 33 as 30% hydrochloric acid 6.

The remaining gas stream 7 of 21 is brought into contact with sulfuric acid in the next step 34 and thus dried.

In a chlorine compressor 35, the dried gas stream 8 is compressed to 12 bar. The chlorine compressor 35 is, like the HCl compressor 30, equipped with a blown circulation line with control valve (not shown). Upstream of the chlorine compressor there is a pressure measurement 65, which, together with the control valve in the blown circulation line of the chlorine compressor and the control device 100, forms a regulator circuit. By means of this regulation, the pressure upstream of the chlorine compressor is maintained at 4.5 bar.

In a connected distillation column 36, the dried and compressed gas stream 9 is freed of components such as $O_2$, $N_2$ and $CO_2$ (stream 11). The chlorine 10 forming at the bottom of this column is drawn off as a liquid. The separated components are removed in gaseous form at the head of the column. In the head line there is a pressure measurement 61 and downstream of this a control valve 51, which forms, together with the control device 97, a regulator circuit with which the pressure in the head line is maintained at 12 bar.

Downstream of the control valve 51 a partial stream 12 of 0.4 is discharged and fed into a waste gas treatment 37, in which residual chlorine gas is removed. The discharged flow 12 is adjusted via a control valve 52. For this purpose, another pressure measurement 62 is installed upstream of the discharge line with a control device 95; the two form a regulator circuit together with the control valve 52. The control valve 52 now allows sufficient gas to pass for a pressure of 6.5 bar to be maintained.

Downstream of the partial stream discharge, the $O_2$ content is measured in the flow of the remaining gas 13 using a measuring instrument 81.

Since the remaining gas 13 is returned into the process, it should be freed of components that deactivate the catalyst in the reaction zone. For this purpose, a gas wash 38 is provided, from which the purified gas stream 14 exits. If the remaining gas 13 contains no catalyst-deactivating components, it can bypass the gas wash 38 (shown as a broken line).

Downstream of the gas wash 38, fresh oxygen 15 is fed in to replace the oxygen consumed in the process. The rate of flow is measured (measuring instrument 73). Downstream of the measurement there is a control valve 53, which forms, together with the flow measurement 73 and the control unit 93, a regulator circuit. With this regulator circuit, following the HCl gas stream 3 fed in, the quantity of fresh oxygen 15 is adjusted to 2 t/h. By means of the measurement of the $O_2$ content described above and the control unit 94, this adjustment is performed as a correction.

In order to be able now to regulate the stream 14, which is returned into the process, an additional control armature must be provided, which is not required in example 1 and generates an additional pressure drop. For this purpose, the rate of flow of the gas stream 14 is measured downstream of the gas wash using a flow measuring instrument 75. In addition, a control valve 55 is inserted in the stream 14. This forms, together with the flow measurement 75 of the gas stream 14 and the control unit 101 a regulator circuit. With this regulator circuit, the flow rate measured is adjusted to 12 t/h. The set value follows the HCl gas stream fed in, so that when this increases, the rate of flow being regulated here also increases. In the control valve 55, the pressure falls to about 5.5 bar at the same time.

This additional regulator circuit regulates the rate of flow only directly, since e.g. when a higher rate of flow is required, the control valve 55 opens and the pressure downstream rises until, to regulate the admission pressure of the chlorine compressor 35, the control unit 100 has closed the blown circulation line thereof sufficiently and thus increased the circulating stream. This leads to an unnecessary delay and thus to poorer quality of regulation. In addition, the increasing pressure upstream of the reaction zone 32 leads to unnecessary fluctuation in the reaction zone, which impairs the quality of regulation still further.

The invention claimed is:

1. A process for the production of chlorine by a catalysed gas phase oxidation of hydrogen chloride with an oxygen-containing gas stream, consisting of the process stages:
    a) compressing a hydrogen chloride stream (1) in an HCl compression step (30) to an elevated pressure to obtain a compressed hydrogen chloride stream (2);
    b) purifying the compressed hydrogen chloride stream (2) in an HCl gas purification step (31) to obtain a purified hydrogen chloride stream (3);
    c) combining an oxygen-containing return stream (16) with the purified hydrogen chloride stream (3) to form a feedstock stream (4);
    d) introducing the feedstock stream (4) into an oxidation zone (32), in which hydrogen chloride and oxygen are partially reacted, in the presence of a catalyst, to form chlorine and water, and a product stream (5), containing chlorine, oxygen, hydrogen chloride and water, is obtained;
    e) introducing the product stream (5) into a process step (33) for the separation of hydrogen chloride and water in the form of aqueous hydrochloric acid (6) from the product stream (5) to obtain a product stream (7);
    f) introducing the product stream (7) at least partly freed from hydrogen chloride and water into a drying step (34) for further drying with a reduction of the proportion of water in the product stream (7);
    g) introducing the dried gas stream (8) obtained from the drying step (34) into a chlorine compression step (35) to increase the pressure of the gas stream (8) with the formation of a compressed gas stream (9);

h) introducing the compressed gas stream (9) into a separation step (36) for the at least partial separation of the chlorine (10) contained in the gas (9) with the formation of a gas stream (11), which contains unreacted oxygen;

i) introducing at least a portion of gas stream (11) remaining after the chlorine separation (36) into a gas-washing process step (38) to form a purified stream (14), a partial stream (12) of the gas stream (11) being discharged between the chlorine separation (36) and the gas-washing step (38) or downstream of the gas-washing step (38);

j) introducing the discharged partial gas stream (12) into a waste gas treatment step (37);

k) combining the stream (14) coming out of the gas-washing step (38), containing unreacted oxygen, with a stream (15) containing fresh oxygen to form an oxygen-containing return stream (16);

l) returning the return stream (16) into the process stage c) to combine this stream (16) with the purified hydrogen chloride stream, characterised in that A) adjustable flow adjustment devices (50, 51, 52, 53) are provided in the lines for the purified hydrogen chloride stream (3), the gas stream (11) remaining after chlorine separation, the partial gas stream (12) which is introduced into the waste gas treatment step and in the fresh oxygen-containing stream (15), B) pressure measuring instruments (63, 61, 62) are provided downstream of or within the HCl gas purification step (31) for purification of the hydrogen chloride stream, in the chlorine separation (36) and in the line for the stream (11) remaining after the chlorine separation downstream of the flow adjustment device (51), C) flow measuring instruments (71, 72, 73) are provided in the lines for the purified hydrogen chloride stream (3), the gas stream (13) remaining after the chlorine separation after discharging a partial stream (12) for waste gas treatment and the fresh oxygen-containing stream (15), D) an instrument (81) for measuring the oxygen concentration is provided in the gas stream (13) remaining after the chlorine separation after discharging a partial stream (12) for waste gas treatment, E) both the hydrogen chloride compression (30) and the chlorine compression (35) steps are provided with adjustable performance, F) by means of a first control unit (91) the purified hydrogen chloride stream (3) is maintained at a constant rate of flow by adjusting the flow adjustment device (50) in this stream (3), G) by means of a second control unit (92) the pressure measured in or downstream of the process step (31) for purifying the compressed hydrogen chloride stream is maintained at a constant value by adjusting the hydrogen chloride compression (30), H) by means of a third control unit (93) the fresh oxygen-containing stream (15) is maintained at a constant flow rate ratio to the purified hydrogen chloride stream (3) by adjusting the flow adjustment device (53) in the fresh oxygen-containing stream (15), I) by means of a fourth control unit (94) the aforementioned flow rate ratio between the fresh oxygen-containing stream (15) and the purified hydrogen chloride stream (3) is finely adjusted so that the oxygen content that is measured in the gas stream (13) remaining after the chlorine separation after discharge of a partial stream (12) for waste gas treatment is kept constant, J) by means of a fifth control unit (95) the pressure measured in the gas stream (11) remaining after the chlorine separation (36) downstream of the flow adjustment device (51) is maintained at a constant value by adjusting the flow adjustment device (52) for the partial stream (12) introduced into the waste gas treatment (37), K) by means of a sixth control device (96) the rate of flow of the gas stream (13) remaining after the chlorine separation after discharge of a partial stream (12) for waste gas treatment is maintained at a constant value by adjusting the chlorine compression step (35), and L) by means of a seventh control device (97) the pressure measured in the chlorine separation (36) is maintained at a constant value by adjusting the flow adjustment device (51) in the gas stream (11) remaining after the chlorine separation (36).

2. The process according to claim 1, characterised in that the oxygen concentration is measured in the gas stream (11) remaining after the chlorine separation, or in the partial stream (12) discharged to the waste gas treatment step, or in the stream (14) coming from the gas wash step (38), or in the stream (16) after combining the stream (14) with a fresh oxygen-containing stream (15).

3. The process according to claim 1, characterised in that the pressure adjusted by the second control unit (92) is 2 to 20 bar, the oxygen content adjusted by the fourth control unit (94) is 10 to 90 vol. %, the pressure adjusted by the fifth control unit (95) is 2 to 20 bar, and the pressure adjusted by the seventh control unit (97) is 6 to 30 bar.

4. The process according to claim 1, characterised in that in the oxidation step (32) a ruthenium catalyst is used.

5. The process according to claim 1, characterised in that in the oxidation step (32) a catalyst based on ruthenium chloride and tin oxide as carrier material is used.

6. A process for the production of chlorine by a catalysed gas phase oxidation of hydrogen chloride with an oxygen-containing gas stream, consisting of the process stages:

a) compressing a hydrogen chloride stream (1) in an HCl compression step (30) to an elevated pressure to obtain a compressed hydrogen chloride stream (2);

b) purifying the compressed hydrogen chloride stream (2) in an HCl gas purification step (31) to obtain a purified hydrogen chloride stream (3);

c) combining an oxygen-containing return stream (16) with the purified hydrogen chloride stream (3) to form a feedstock stream (4);

d) introducing the feedstock stream (4) into an oxidation zone (32), in which hydrogen chloride and oxygen are partially reacted in the presence of a catalyst to form chlorine and water, and a product stream (5), containing chlorine, oxygen, hydrogen chloride and water, is obtained;

e) introducing the product stream (5) into a process step (33) for the separation of hydrogen chloride and water in the form of aqueous hydrochloric acid (6) from the product stream (5) to obtain a product stream (7);

f) introducing the product stream (7) at least partly freed from hydrogen chloride and water into a drying step (34) for further drying with a reduction of the proportion of water in the product stream (7);

g) introducing the dried gas stream (8) obtained from the drying step (34) into a chlorine compression step (35) to increase the pressure of the gas stream (8) with the formation of a compressed gas stream (9);

h) introducing the compressed gas stream (9) into a separation step (36) for the at least partial separation of the chlorine (10) contained in the gas (9) with the formation of a gas stream (11), which contains unreacted oxygen;

i) combining at least a portion of gas stream (11) remaining after the chlorine separation (36), containing unreacted oxygen, with a stream (15) containing fresh oxygen to form an oxygen-containing return stream (16);

j) a partial stream (12) of the gas stream (11) being discharged between the chlorine separation (36) and the forming of the oxygen containing return stream (16);

k) introducing the discharged partial gas stream (12) into a waste gas treatment step (37);

l) returning the return stream (16) into the process stage c) to combine this stream (16) with the purified hydrogen chloride stream, characterised in that A) adjustable flow adjustment devices (50, 51, 52, 53) are provided in the lines for the purified hydrogen chloride stream (3), the gas stream (11) remaining after chlorine separation, the partial gas stream (12) which is introduced into the waste gas treatment step and in the fresh oxygen-containing stream (15), B) pressure measuring instruments (63, 61, 62) are provided downstream of or within the HCl gas purification step (31) for purification of the hydrogen chloride stream, in the chlorine separation (36) and in the line for the stream (11) remaining after the chlorine separation downstream of the flow adjustment device (51), C) flow measuring instruments (71, 72, 73) are provided in the lines for the purified hydrogen chloride stream (3), the gas stream (13) remaining after the chlorine separation after discharging a partial stream (12) for waste gas treatment and the fresh oxygen-containing stream (15), D) an instrument (81) for measuring the oxygen concentration is provided in the gas stream (13) remaining after the chlorine separation after discharging a partial stream (12) for waste gas treatment, E) both the hydrogen chloride compression (30) and the chlorine compression (35) steps are provided with adjustable performance, F) by means of a first control unit (91) the purified hydrogen chloride stream (3) is maintained at a constant rate of flow by adjusting the flow adjustment device (50) in this stream (3), G) by means of a second control unit (92) the pressure measured in or downstream of the process step (31) for purifying the compressed hydrogen chloride stream is maintained at a constant value by adjusting the hydrogen chloride compression (30), H) by means of a third control unit (93) the fresh oxygen-containing stream (15) is maintained at a constant flow rate ratio to the purified hydrogen chloride stream (3) by adjusting the flow adjustment device (53) in the fresh oxygen-containing stream (15), I) by means of a fourth control unit (94) the aforementioned flow rate ratio between the fresh oxygen-containing stream (15) and the purified hydrogen chloride stream (3) is finely adjusted so that the oxygen content that is measured in the gas stream (13) remaining after the chlorine separation after discharge of a partial stream (12) for waste gas treatment is kept constant, J) by means of a fifth control unit (95) the pressure measured in the gas stream (11) remaining after the chlorine separation (36) downstream of the flow adjustment device (51) is maintained at a constant value by adjusting the flow adjustment device (52) for the partial stream (12) introduced into the waste gas treatment (37), K) by means of a sixth control device (96) the rate of flow of the gas stream (13) remaining after the chlorine separation after discharge of a partial stream (12) for waste gas treatment is maintained at a constant value by adjusting the chlorine compression step (35), and L) by means of a seventh control device (97) the pressure measured in the chlorine separation (36) is maintained at a constant value by adjusting the flow adjustment device (51) in the gas stream (11) remaining after the chlorine separation (36).

7. The process according to claim 6, characterised in that the oxygen concentration is measured in the gas stream (11) remaining after the chlorine separation, or in the partial stream (12) discharged to the waste gas treatment step, or in the stream (16) after combining at least a portion of gas stream (11) with a fresh oxygen-containing stream (15).

8. The process according to claim 6, characterised in that the pressure adjusted by the second control unit (92) is 2 to 20 bar,
the oxygen content adjusted by the fourth control unit (94) is 10 to 90 vol. %,
the pressure adjusted by the fifth control unit (95) is 2 to 20 bar,
and the pressure adjusted by the seventh control unit (97) is 6 to 30 bar.

9. The process according to claim 6, characterised in that in the oxidation step (32) a ruthenium catalyst is used.

10. The process according to claim 6, characterised in that in the oxidation step (32) a catalyst based on ruthenium chloride and tin oxide as carrier material is used.

11. A process for the production of chlorine by a catalysed gas phase oxidation of hydrogen chloride with an oxygen-containing gas stream, consisting of the process stages:

a) compressing a hydrogen chloride stream (1) in an HCl compression step (30) to an elevated pressure to obtain a compressed hydrogen chloride stream (2);

b) purifying the compressed hydrogen chloride stream (2) in an HCl gas purification step (31) to obtain a purified hydrogen chloride stream (3);

c) combining an oxygen-containing return stream (16) with the purified hydrogen chloride stream (3) to form a feedstock stream (4);

d) introducing the feedstock stream (4) into an oxidation zone (32), in which hydrogen chloride and oxygen are partially reacted, in the presence of a catalyst, to form chlorine and water, and a product stream (5), containing chlorine, oxygen, hydrogen chloride and water, is obtained;

e) introducing the product stream (5) into a process step (33) for the separation of hydrogen chloride and water in the form of aqueous hydrochloric acid (6) from the product stream (5) to obtain a product stream (7);

f) introducing the product stream (7) at least partly freed from hydrogen chloride and water into a drying step (34) for further drying with a reduction of the proportion of water in the product stream (7);

g) introducing the dried gas stream (8) obtained from the drying step (34) into a chlorine compression step (35) to increase the pressure of the gas stream (8) with the formation of a compressed gas stream (9);

h) introducing the compressed gas stream (9) into a separation step (36) for the at least partial separation of the chlorine (10) contained in the gas (9) with the formation of a gas stream (11), which contains unreacted oxygen;

i) introducing at least a portion of gas stream (11) remaining after the chlorine separation (36) into a gas-washing process step (38) to form a purified stream (14), a partial stream (12) of the gas stream (11) being discharged between the chlorine separation (36) and the gas-washing step (38) or downstream of the gas-washing step (38);

j) introducing the discharged partial gas stream (12) into a waste gas treatment step (37);

k) combining the stream (14) coming out of the gas-washing step (38), containing unreacted oxygen, with a stream (15) containing fresh oxygen to form an oxygen-containing return stream (16);

l) returning the return stream (16) into the process stage c) to combine this stream (16) with the purified hydrogen chloride stream;

m) discharging a further partial stream (17) from the gas stream (11) remaining after the chlorine separation (36), n) compressing the further partial stream (17) in a pressure increasing step (39) to obtain a compressed partial stream (18), o) feeding the compressed partial stream (18) into a chlorine recovery step (40), p) separating the chlorine contained in the compressed partial stream (18) by distillation at low temperature, q) feeding the separated chlorine as a return stream (19) to the chlorine separation (36), and r) feeding a gas stream (20) remaining after the chlorine has been separated in the chlorine recovery step (40) into the waste gas treatment (37);

characterised in that

A) adjustable flow adjustment devices (50, 51, 52, 53) are provided in the lines for the purified hydrogen chloride stream (3), the gas stream (11) remaining after chlorine separation, the partial gas stream (12) which is introduced into the waste gas treatment step and in the fresh oxygen-containing stream (15), B) pressure measuring instruments (63, 61, 62) are provided downstream of or within the HCl gas purification step (31) for purification of the hydrogen chloride stream, in the chlorine separation (36) and in the line for the stream (11) remaining after the chlorine separation downstream of the flow adjustment device (51), C) flow measuring instruments (71, 72, 73) are provided in the lines for the purified hydrogen chloride stream (3), the gas stream (13) remaining after the chlorine separation after discharging a partial stream (12) for waste gas treatment and the fresh oxygen-containing stream (15), D) an instrument (81) for measuring the oxygen concentration is provided in the gas stream (13) remaining after the chlorine separation after discharging a partial stream (12) for waste gas treatment, E) both the hydrogen chloride compression (30) and the chlorine compression (35) steps are provided with adjustable performance, F) by means of a first control unit (91) the purified hydrogen chloride stream (3) is maintained at a constant rate of flow by adjusting the flow adjustment device (50) in this stream (3), G) by means of a second control unit (92) the pressure measured in or downstream of the process step (31) for purifying the compressed hydrogen chloride stream is maintained at a constant value by adjusting the hydrogen chloride compression (30), H) by means of a third control unit (93) the fresh oxygen-containing stream (15) is maintained at a constant flow rate ratio to the purified hydrogen chloride stream (3) by adjusting the flow adjustment device (53) in the fresh oxygen-containing stream (15), I) by means of a fourth control unit (94) the aforementioned flow rate ratio between the fresh oxygen-containing stream (15) and the purified hydrogen chloride stream (3) is finely adjusted so that the oxygen content that is measured in the gas stream (13) remaining after the chlorine separation after discharge of a partial stream (12) for waste gas treatment is kept constant, J) by means of a fifth control unit (95) the pressure measured in the gas stream (11) remaining after the chlorine separation (36) downstream of the flow adjustment device (51) is maintained at a constant value by adjusting the flow adjustment device (52) for the partial stream (12) introduced into the waste gas treatment (37), K) by means of a sixth control device (96) the rate of flow of the gas stream (13) remaining after the chlorine separation after discharge of a partial stream (12) for waste gas treatment is maintained at a constant value by adjusting the chlorine compression step (35), and L) by means of a seventh control device (97) the pressure measured in the chlorine separation (36) is maintained at a constant value by adjusting the flow adjustment device (51) in the gas stream (11) remaining after the chlorine separation (36);

M) an adjustable flow adjustment device (54) is provided in the line of the gas stream (20) remaining after the chlorine recovery step (40);

N) a flow measuring instrument (74) is provided in the further partial stream (17), which is passed into the pressure increasing step (39);

O) a pressure measuring instrument (64) is provided in or downstream of the chlorine recovery step (40), upstream of the flow adjustment device (54) for the gas stream (20) remaining after this step;

P) the pressure increasing device (39) is provided with adjustable performance;

Q) by means of an eighth control device (98) the flow rate of the further partial stream (17) is adjusted by adjusting the performance of the pressure increasing device (39) such that the partial stream (12) to the waste gas treatment (37) described above is minimised, and R) by means of a ninth control device (99) the pressure measured in or downstream of the chlorine recovery step (40) is kept constant by adjusting the flow adjustment device 54.

12. The process according to claim 11, characterised in that the oxygen concentration is measured in the gas stream (11) remaining after the chlorine separation, or in the partial stream (12) discharged to the waste gas treatment step, or in the stream (16) after combining at least a portion of gas stream (11) with a fresh oxygen-containing stream (15).

13. The process according to claim 11, characterised in that the pressure adjusted by the second control unit (92) is 2 to 20 bar,
the oxygen content adjusted by the fourth control unit (94) is 10 to 90 vol. %,
the pressure adjusted by the fifth control unit (95) is 2 to 20 bar,
and the pressure adjusted by the seventh control unit (97) is 6 to 30 bar.

14. The process according to claim 11, characterised in that in the oxidation step (32) a ruthenium catalyst is used.

15. The process according to claim 11, characterised in that in the oxidation step (32) a catalyst based on ruthenium chloride and tin oxide as carrier material is used.

16. The process according to claim 11, characterised in that the oxygen concentration is measured in the gas stream (11) remaining after the chlorine separation, or in the partial stream (12) discharged to the waste gas treatment step, or in the further partial stream (17) discharged to the pressure increasing step, or in the stream (14) coming from the gas wash step (38), or in the stream (16) after combining the stream (14) with a fresh oxygen-containing stream (15).

* * * * *